Oct. 13, 1936.                J. FISCHER                2,057,611
                        ATTACHMENT FOR AUTOMOBILES
                           Filed July 2, 1935
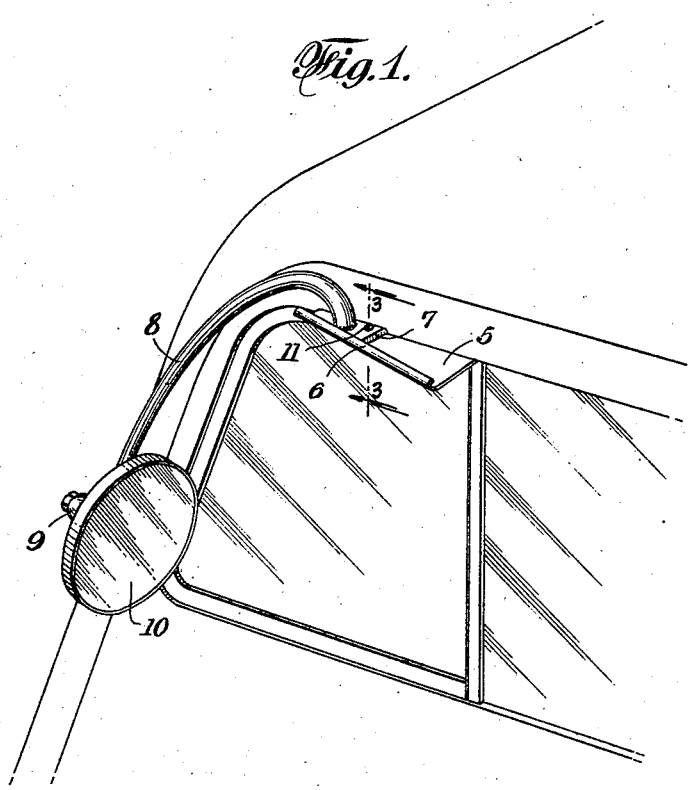
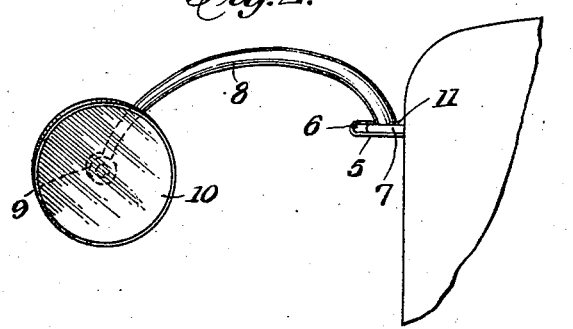   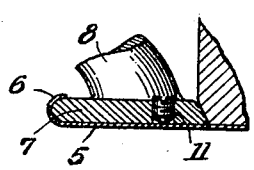
INVENTOR
JOSEPH FISCHER
BY
Evarts, Lemlein & Wolsky
ATTORNEYS Patented Oct. 13, 1936

2,057,611

UNITED STATES PATENT OFFICE 2,057,611

ATTACHMENT FOR AUTOMOBILES

Joseph Fischer, New York, N. Y.

Application July 2, 1935, Serial No. 29,577

1 Claim. (Cl. 248—225)

My present invention relates to an attachment for automobiles, particularly to a mirror, flag or other ornamental or utilitarian element which may be affixed above the so-called "no draft ventilation" window of the front door of the more recent modeled automobiles.

These newer models embody a splash-pan, and I have found great utility in affixing the mirror to this splash-pan.

Other advantages and superiorities of my present invention will in part be hereinafter pointed out, and will in part be obvious to those skilled in the art to which my present invention relates.

In the drawing, Fig. 1 is a perspective view of the left front door of an automobile, showing the device of my present invention, utilizing a mirror, for example, in use.

Fig. 2 is an elevation, showing the device of my present invention, as illustrated in Fig. 1, as viewed from the rear of the automobile.

Fig. 3 is a fragmentary detailed view along the line of 3—3 of Fig. 1.

At 5 is shown the splash-pan, which may be stream-lined, having a curled up portion or flange 6. In this pan 5 there is placed a wedge shaped base 7 affixed to a bracket 8, the bracket containing means 9 to hold the mirror 10. These means 9 may consist of the ordinary ball and socket, or any other suitable device to hold the mirror, and to allow its free movement.

At 11 is shown a set screw on the wedge 7, which is designed to bite into the metal of the pan 5 and thus hold the entire device in place.

The foregoing description is set forth by way of illustration only, and various modifications may be made therein without departing from the spirit of the invention or the scope of the claim.

What I claim as my invention is:

Supporting means for an automobile attachment comprising in combination, a wedge-shaped splash pan attached to the automobile window frame and provided with a flange along its edge, and a bracket having a wedge-shaped base attached to one end thereof, slidably mounted between said flange and window frame.

JOSEPH FISCHER.